United States Patent [19]

Shang

[11] 4,124,454
[45] Nov. 7, 1978

[54] ELECTROLYTIC TREATMENT OF METAL SHEET

[76] Inventor: Wai K. Shang, 501 Wellington House 3A Wyndham St., Hong Kong, Hong Kong

[21] Appl. No.: 830,686

[22] Filed: Sep. 6, 1977

[30] Foreign Application Priority Data

Oct. 4, 1976 [GB] United Kingdom ............... 41114/76

[51] Int. Cl.² .................... C25D 7/00; C25D 17/06
[52] U.S. Cl. ........................................ 204/27; 204/28; 204/198; 204/202; 204/297 M; 204/DIG. 5
[58] Field of Search ................... 204/27, 28, 198, 202, 204/297 M, DIG. 5

[56] References Cited

U.S. PATENT DOCUMENTS 3,697,399 10/1972 Usui .................................. 204/297 M

FOREIGN PATENT DOCUMENTS 22,367 4/1935 Australia ............................. 204/297 M Primary Examiner—John H. Mack
Assistant Examiner—William Leader
Attorney, Agent, or Firm—Lerner, David, Littenberg & Samuel

[57] ABSTRACT

A ferromagnetic metal sheet, e.g. of mild steel to be tin-plated, is transported across the surface of a bath of electrolyte by means of a conveyor comprising a series of rollers. A magnetic field is produced in each roller, e.g. by permanent magnets, so that the sheet is held against the underside of the conveyor by the resulting magnetic force acting on the sheet. The upper surface of the sheet may be in contact with the series of rollers or with an endless flexible strip passing along the underside of the series of rollers. The lower surface of the sheet is in contact with the electrolyte.

17 Claims, 5 Drawing Figures

ELECTROLYTIC TREATMENT OF METAL SHEET

BACKGROUND OF THE INVENTION

This invention relates to a method of electrolytically treating a metal sheet, and to apparatus for the use in this method. In particular, but not solely, it relates to tin-plating a steel sheet.

Hot dip tinning has been virtually superseded by electrolyte pin-plating, which can produce thinner tin coatings of excellent quality. Typical of modern tin plating are the "Halogen" process and the "Ferrostan" process. Both of these processes treat steel strip at the rate of 1,400 – 2,000 ft/min (totalling 140,000 to 200,000 tons per year) and involve a large capital investment.

However, particularly in the developing countries, there are many circumstances in which it would be desirable to be able to tin-plate individual sheets continuously (rather than batch-wise) at the rate of, say, 10,000 to 20,000 tons per year with comparatively simple and inexpensive equipment. It would also be desirable to be able to electrolytically treat individual sheets continuously, but up to now no satisfactory technique has been developed, despite considerable research.

BRIEF DESCRIPTION OF THE INVENTION

The present invention provides apparatus for use in electrolytic treatment of a ferromagnetic metal sheet, comprising a tank for containing an electrolyte and a conveyor for transporting the sheet across the surface of the electrolyte, the conveyor comprising a series of rollers, each roller having means for producing a magnetic field so that the sheet will be held against the underside of the conveyor by the resulting magnetic force acting on the sheet.

The invention also provides a method of electrolytically treating a ferromagnetic metal sheet, in which the sheet is transported across the surface of a bath of electrolyte by means of a conveyor comprising a series of rollers, a magnetic field being produced in each roller so that the sheet is held against the underside of the conveyor by the resulting magnetic force acting on the sheet, the lower surface of the sheet being in contact with the electrolyte.

The above-described method and apparatus can be used for electroplating, particularly for plating steel sheet with tin, chromium, or zinc, electrolytic de-greasing, or electrolytic pickling.

The magnetic field producing means may comprise electromagnets or, preferably, permanent magnets. Preferably each roller is tubular and contains permanent magnets spaced along it. Alternatively, some or all of the rollers could be solid and permanently magnetised.

The rollers are preferably exposed at the underside of the conveyor so that the sheet is in contact with the series of rollers. The axes of the rollers should preferably be spaced apart by a distance which is less than one-third of the length of the sheet. It is convenient for the surface of at least one roller to be electrically conductive and to be electrically connected, in use, to a source of electrical power.

Alternatively, the conveyor may include an endless flexible strip passing along the underside of the series of rollers in order to cover the upper surface of the sheet, in order to prevent electrolyte from contaminating the upper surface. In this case it is convenient for the strip to be electrically conductive and to be electrically connected, in use, to a source of electrical power.

BRIEF DESCRIPTION OF THE FIGURES

The invention will be described further, by way of example only, with reference to the accompanying drawings, in which.

DETAILED DESCRIPTION OF THE PREFERRED EMBODIMENTS

Figure 1:
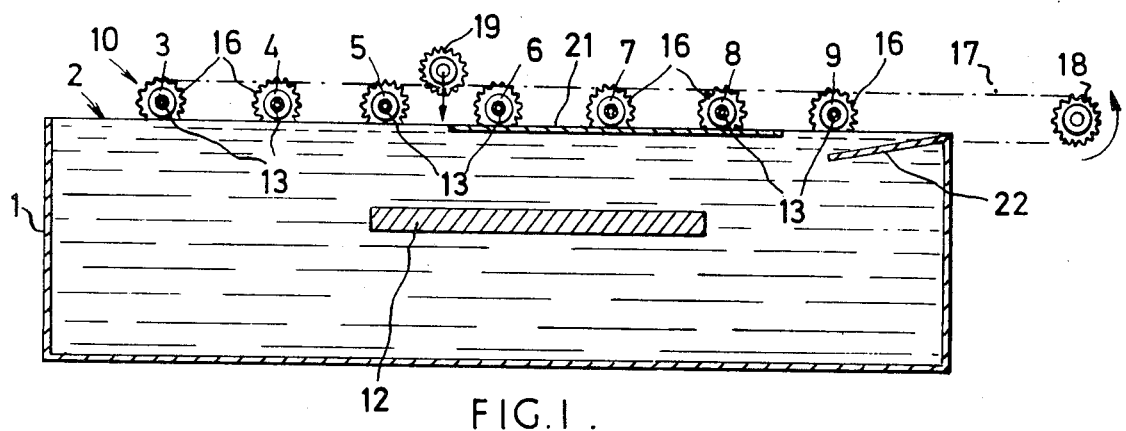
FIG. 1 diagrammatically shows a longitudinal section through an apparatus forming part of an electrolytic tin-plating installation.
Figure 2:
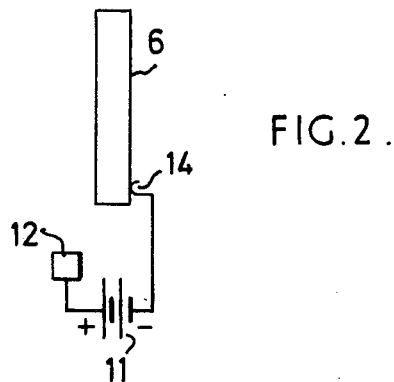
FIG. 2 is an electrical circuit diagram of the apparatus.
Figure 3:
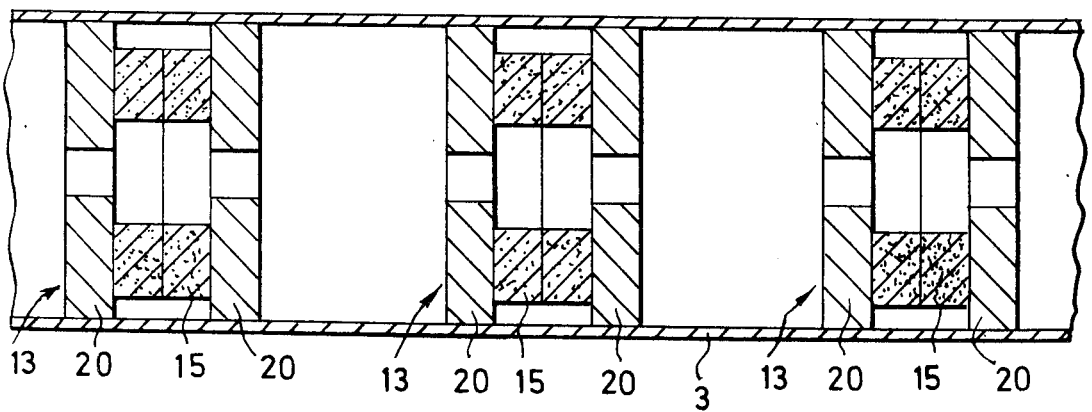
FIG. 3 is an axial section through part of the length of a roller.

In the apparatus shown in FIG. 1, a rectangular tank 1 contains a conventional electrolyte (stannous chloride solution) as used in the "Halogen" process for tin-plating. The surface 2 of the bath of electrolyte is maintained at a constant level by allowing the electrolyte to overflow from the tank 1. A series of rollers 3 to 9, constituting a conveyor 10, are rotatably mounted transversely of the tank 1 and are equally spaced. The rollers 3 to 9 comprise tubes of titanium or a stainless steel which resists electrodeposition of tin (e.g. 300 series stainless steel). The surface of the middle roller 6 is connected by a sliding contact 14 to the negative pole of a d.c. source 11, whose positive pole is connected to a tin anode 12 immersed in the electrolyte. Each tubular roller 3 to 9 contains permanent magnets 13 comprising barium ferrite ($Ba_2CO_3/Fe_2O_3$) cores 15 mounted between soft iron armatures 20 (FIG. 3). The rollers 3 to 9 carry sprockets 16 and are rotatable anticlockwise (as seen in FIG. 1) by a chain 17 driven by a drive sprocket 18 and acted on by a tensioning sprocket 19.

A mild steel sheet 21 to be tin-plated, when inserted into the left-hand (FIG. 1) end of the tank 1, will be held against the rollers 3 to 9 by the magnetic force acting on the sheet 21 as a result of the magnetic fields produced by the magnets 13. The length of the sheet 21 is preferably more than three times the spacing between the axes of the rollers so that the sheet is maintained horizontal. The rollers 3 to 9 are just above and tangential to the surface 2 of the electrolyte, and therefore only the lower surface of the sheet 21 is in contact with the electrolyte. The rotation of the rollers 3 to 9 advances the sheet 21 along the underside of the conveyor 10 to the right-hand end of the tank 1, where it is directed out of the tank 1 by a ramp 22. As long as the sheet 21 is in contact with the middle roller 6, the sheet acts as a cathode, so that tin is deposited on its lower surface.

In the complete installation there are, for example, six or 12 (or more) apparatuses as described above, arranged in series. One side of the sheet 21 is plated in the first three or six apparatuses; then the sheet 21 is turned over, and its other side is plated in the last three or six apparatuses.

The electroplated sheet is subjected to a conventional process known as reflowing (or flow-brightening), in which the sheet is passed through a furnace having a temperature of 500°–600° C for 1-2 seconds and immediately quenched in cold water. Reflowed tinplate is mirror bright.

Figure 4:
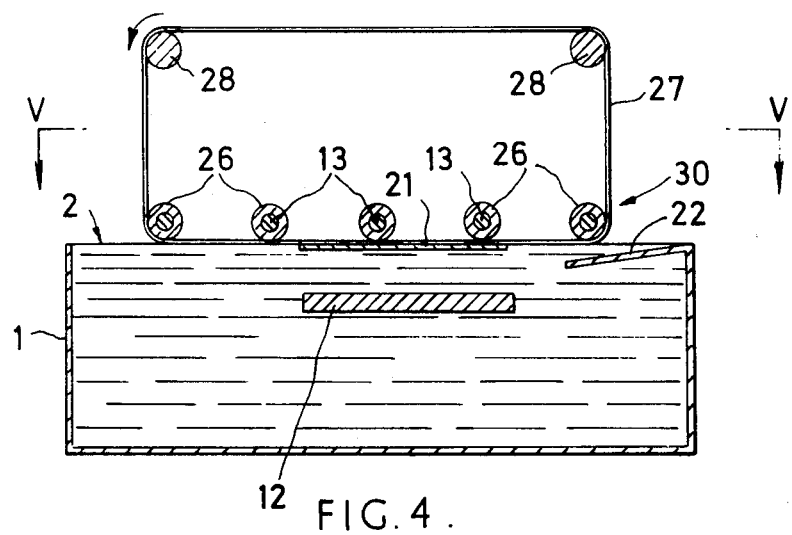
FIG. 4 is a view, similar to FIG. 1, of an alternative embodiment of apparatus.
Figure 5:
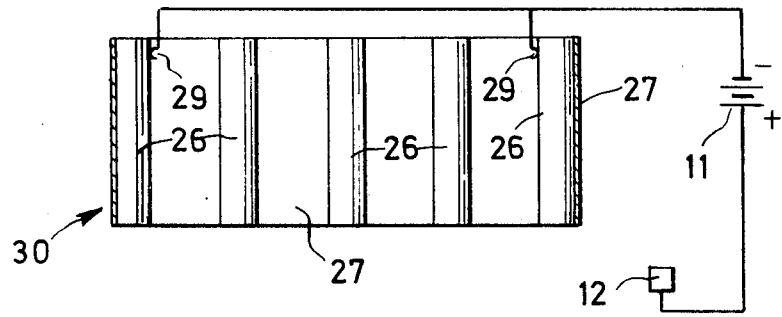
FIG. 5 is a schematic view on line V—V in FIG. 4, in conjunction with an electrical circuit diagram.

The alternative apparatus illustrated in FIGS. 4 and 5 has a conveyor 30 which includes chain-driven rollers 26 comprising electrically conductive tubes (e.g. of titanium or stainless steel) each containing magnets 13 as described above with reference to FIG. 3. The conveyor 30 also includes a flexible strip 27 which runs on an endless path defined by the driven rollers 26 and two idle rollers 28, the strip being of titanium or of a stainless steel which resists electrodeposition of tin. The strip 27 is tangential to the surface 2 of the electrolyte and is driven across the surface 2 by the rotation of the rollers 26.

On the underside of the conveyor 30, the mild steel sheet 21 is held against the strip 27 by the magnetic force acting on the sheet as a result of the magnetic fields of the magnets 13. The two end rollers 26 (and optionally one or more of the intermediate rollers) are electrically connected, via sliding contacts 29, to the negative pole of the d.c. source 11. Since the strip 27 is electrically conductive, the steel sheet 21 acts as a cathode and tin is deposited on its lower surface.

I claim:

1. Apparatus for use in electrolytic treatment of a ferromagnetic metal sheet, comprising a tank for containing an electrolyte means for maintaining the electrolyte at a constant level and a conveyor for transporting the sheet across the surface of the electrolyte, the conveyor comprising a series of rollers, each roller having means for producing a magnetic field so that the sheet will be held against the underside of the conveyor by the resulting magnetic force acting on the sheet, said rollers being positioned to guide the metal sheet so that only the surface opposite that engaging the rollers is coated with electrolyte.

2. The apparatus of claim 1, in which the magnetic field producing means comprise electromagnets.

3. The apparatus of claim 1, in which the magnetic field producing means comprise permanent magnets.

4. The apparatus of claim 1, in which the rollers are exposed at the underside of the conveyor.

5. The apparatus of claim 4, in which the surface of at least one roller is electrically conductive.

6. The apparatus of claim 1, in which the conveyor includes an endless flexible strip passing along the underside of the series of rollers in order to cover the upper surface of the sheet to further protect the upper surface against being coated with electrolyte.

7. The apparatus of claim 6, in which the endless strip is electrically conductive.

8. The apparatus of claim 1 wherein said rollers are each comprised of a hollow elongated tube formed of a metal which resists electrodeposition;
said magnetic field producing means being housed within said tube.

9. The apparatus of claim 8 wherein said magnetic field producing means comprises a plurality of permanent magnets arranged at spaced intervals along the length of each tube.

10. The apparatus of claim 9 further comprising soft iron armatures positioned on opposite sides of each permanent magnet for directing magnetic flux toward the exterior surface of said tube.

11. The apparatus of claim 1 wherein electrolyte is continuously fed to said tank so that the electrolyte overflows from the tank in order to maintain a constant surface level at the top of said tank;
said rollers being arranged so that their undersides are positioned just above said constant level to assure that plates magnetically held to said rollers and conveyed therealong have only their bottom surfaces coated with the electrolyte.

12. A method of electrolytically treating a ferromagnetic metal sheet, comprising the steps of transporting the sheet across the surface of a bath of electrolyte by means of a conveyor comprising a series of rollers, rotating said rollers and producing a magnetic field in each roller which field is directed to the exterior of the roller so that the sheet is held against the underside of the conveyor by the resulting magnetic force acting on the sheet, and positioning the rollers so that only the lower surface of the sheet is in contact with the electrolyte.

13. The method of claim 12, further including positioning the rollers so that the sheet is in contact with at least two rollers as it is being conveyed.

14. The method of claim 13, further including spacing the axes of the rollers by a distance which is less than one-third of the length of the sheet.

15. The method of claim 13, in which the surface of at least one roller is electrically conductive and a source of electrical power is electrically connected to said one roller as it rotates.

16. The method of claim 12, in which the conveyor includes an endless flexible strip about said rollers which strip passes along the underside of the series of rollers and covers the upper surface of the sheet being conveyed.

17. The method of claim 12, in which the endless strip is electrically conductive and connects a source of electrical power to the sheet being treated.

* * * * *

UNITED STATES PATENT AND TRADEMARK OFFICE
CERTIFICATE OF CORRECTION

PATENT NO. : 4,124,454

DATED : November 7, 1978

INVENTOR(S) : Wai K. Shang

It is certified that error appears in the above-identified patent and that said Letters Patent are hereby corrected as shown below:

Column 1, Line 10, the word "pin-plating" should read --tin-plating--

Signed and Sealed this

Sixth Day of March 1979

[SEAL]

Attest:

RUTH C. MASON
*Attesting Officer*

DONALD W. BANNER
*Commissioner of Patents and Trademarks*